United States Patent
Forrester (10) Patent No.: US 7,471,936 B2
(45) Date of Patent: Dec. 30, 2008

(54) GPS RECEIVER IN MOBILE COMMUNICATIONS DEVICES

(75) Inventor: Tim Forrester, San Diego, CA (US)

(73) Assignee: Kyocera Wireless Corp., San Diego, CA (US)

(*) Notice: Subject to any disclaimer, the term of this patent is extended or adjusted under 35 U.S.C. 154(b) by 192 days.

(21) Appl. No.: 11/386,574

(22) Filed: Mar. 21, 2006

(65) Prior Publication Data

US 2006/0160507 A1   Jul. 20, 2006

Related U.S. Application Data

(63) Continuation of application No. 09/975,124, filed on Oct. 9, 2001, now Pat. No. 7,024,220.

(51) Int. Cl.
   *H03J 7/32* (2006.01)
(52) U.S. Cl. .................................. 455/147; 455/255
(58) Field of Classification Search .............. 455/552.1, 455/552.3, 90.1, 90.2, 422.1, 426.1, 86, 76, 455/313, 315, 317
   See application file for complete search history.

(56) References Cited

U.S. PATENT DOCUMENTS

| | | | |
|---|---|---|---|
| 5,235,633 | A | 8/1993 | Dennison et al. |
| 5,390,357 | A | 2/1995 | Nobusawa et al. |
| 5,852,784 | A | 12/1998 | Ito et al. |
| 5,867,771 | A | 2/1999 | Ruitenburg |
| 5,881,369 | A | 3/1999 | Dean et al. |
| 5,896,562 | A | 4/1999 | Heinonen |
| 6,088,348 | A | 7/2000 | Bell, III et al. |
| 6,097,974 | A | 8/2000 | Camp, Jr. et al. |
| 6,505,054 | B1 | 1/2003 | Rydbeck et al. |
| 6,609,010 | B1 | 8/2003 | Dolle et al. |
| 6,665,523 | B1 | 12/2003 | Kasperkovitz et al. |
| 6,694,129 | B2 | 2/2004 | Peterzell et al. |
| 2002/0044087 | A1 | 4/2002 | Krasner |
| 2003/0054775 | A1 | 3/2003 | Eaves et al. |
| 2003/0064699 | A1 | 4/2003 | Olsen |

*Primary Examiner*—Sam Bhattacharya (57) ABSTRACT

GPS functionality is added to a wireless communication device in an efficient and cost effective manner. Disclosed is a wireless communications device that has a common mixer constructed to be used for a GPS signal and another signal, a common IF filter constructed to be used for a GPS signal and another signal, in addition to other cost effective embodiments.

20 Claims, 8 Drawing Sheets

Fig. 5b
Active Mixer Response

Fig. 5c
Passive Mixer Response

Fig. 5d
Passive Mixer Configuration

GPS RECEIVER IN MOBILE COMMUNICATIONS DEVICES

RELATED APPLICATION

This application is a continuation of application Ser. No. 09/975,124 filed on Oct. 9, 2001 now U.S. Pat. No. 7,024,220 Application Ser. No. 09/975,124 is explicitly incorporated in full into this application.

FIELD

The field of the present invention is mobile communications devices. More particularly, the present invention relates to receivers for wireless communications devices.

BACKGROUND

Demands placed on wireless communications devices are continually increasing. While the number of functions required of wireless communications devices is increasing, consumers are simultaneously demanding lower cost devices with longer use times between battery charging and which are lighter and smaller than previous devices.

Particularly, there is a high demand for adding global positioning systems (GPS) services to the functions of wireless communications devices. More specifically, consumers want a wireless communications device that has both GPS and PCS services or GPS and cellular CDMA, among other services. Additionally, some government agencies, e.g., the FCC in the United States, are mandating that position location functionality be incorporated into wireless communications devices which is able to meet a specific accuracy. GPS is one solution which can meet this requirement and operates at a frequency of 1575.42 MHz, as is well known in the art. PCS is a wireless communication band at a frequency of about 1960 MHz, as is well known in the art. Cellular CDMA is a wireless communication system at a frequency of about 870 MHz, as is well known in the art.

In a typical wireless communications device receiver, an antenna assembly receives a radio frequency (rf) signal from the air. The antenna assembly may includes an antenna, an antenna matching circuit and any other component required to receive the rf signal. The signal is a series of electromagnetic fields travelling in waves in the air at a certain frequency, the radio frequency. The waves carry energy. The antenna captures some of this energy so that the energy can travel along a guided path. The guided path may be a wave guide or metal conductors, such as wires or strips of metal, known as microstrip lines, on a substrate, among other things.

The signal captured by the antenna may have waves of frequencies other than the desired rf. Filters are used to block any signal component at frequencies other than the desired rf. Thus, the rf signal is made to travel through one or more filters to select a desired frequency or range of frequencies. Also, the desired rf signal may be very weak. Amplifiers are used to magnify the strength of the rf signal. Thus, the rf signal is made to pass through one or more amplifiers.

The rf signal carries information. The information is contained in changing phase, amplitude or frequency of the rf signal. To get this information out of the signal, the signal is typically compared to an rf signal of constant phase, amplitude or frequency. The constant phase, amplitude or frequency rf signal is known as a local oscillator signal and comes from a precise rf signal generator in the communication device, known as a local oscillator. The local oscillator signal is combined with the rf signal by a device known as a mixer. The mixer produces sum and difference signals of the local oscillator signal and the rf signal. This process of producing sum and difference signals from two initial signals is known as mixing, producing mixed signals.

Commonly, the rf signal is mixed once down to an intermediate frequency (IF) signal and then again down to what is known as a baseband signal. Both the IF signal and the baseband signal are lower frequency signals. A baseband signal contains the coded information that the original rf signal was carrying. When the rf signal is mixed down to an IF signal, one of the mixed signals is typically chosen to carry the message contained in the rf signal. This chosen signal is known as the IF signal. The IF signal is typically selected by an IF filter designed to transmit the IF signal only.

After the IF filter, and possible further filtering and amplification, the signal encounters another mixer, where it is mixed with another local oscillator signal. This local oscillator signal has a frequency equal to the IF signal frequency. Again, sum and difference signals are produced. The signal of interest at this point is known as the baseband signal. The baseband signal is also known as the "zero frequency difference" signal, even though the frequency of the baseband signal is not zero. Its frequency is the frequency of the coded information that it carries. The baseband signal is then decoded to reveal whatever information was transmitted. It will be appreciated that the signal may be mixed directly from an rf signal down to baseband. In this case, there is no IF signal.

When GPS service is added to a wireless communication device, the GPS receiver portion typically has each of the above devices to process the GPS rf signal. In various designers' attempts to combine PCS and GPS services in one device, separate mixers have been used for down converting PCS to an intermediate frequency (IF) and for down converting GPS to an IF. Additionally, separate IF filters have been used to filter the IF signal after down conversion to IF and before down conversion to baseband. The same is true of attempts to combine GPS and cellular CDMA. Separate mixers and IF filters have been used. Thus, the cost, size and power consumption of prior art GPS enabled devices is significantly more than that of those without GPS services.

SUMMARY

The cost, size and power consumption of prior art GPS enabled wireless communication devices is significantly more than that of those without GPS services. Accordingly, it would be desirable to have an rf communication device, particularly a PCS wireless communication device and a cellular CDMA wireless communication device with cost effective and size and power consumption efficient GPS functionality.

Generally, the invention allows GPS functionality to be added to a wireless communication device in an efficient and cost effective manner. Briefly, the present invention has a common mixer constructed to be used for a GPS signal and another signal, such as a PCS signal. In one embodiment, a common mixer and IF filter are used for both PCS and GPS signals. In another embodiment, a band select switch may be used to select either the PCS signal or the GPS signal. Alternatively, a duplexer or diplexer may couple the GPS signal and the PCS signal to the common mixer. In this way, a common mixer is enabled to be used for both GPS and PCS.

A dual band local oscillator may be configured to output a local oscillator signal facilitating selection of a GPS IF signal, a PCS IF signal or a cellular CDMA IF signal, using a common IF filter. In another embodiment, both the GPS low noise amplifier (LNA) and the PCS LNA may be switched on and off depending upon whether GPS or PCS reception is selected. In another embodiment, a common IF filter may be used for both GPS and cellular CDMA signals.

This reuse of a mixer and an IF filter desirably contain the cost, size and power consumption of a GPS/PCS enabled wireless handset.

BRIEF DESCRIPTION OF THE DRAWINGS

For a more complete understanding of the present invention, and the advantages thereof, reference is now made to the following descriptions taken in conjunction with the accompanying drawings, tables and attachments, in which.

DETAILED DESCRIPTION

Figure 1:
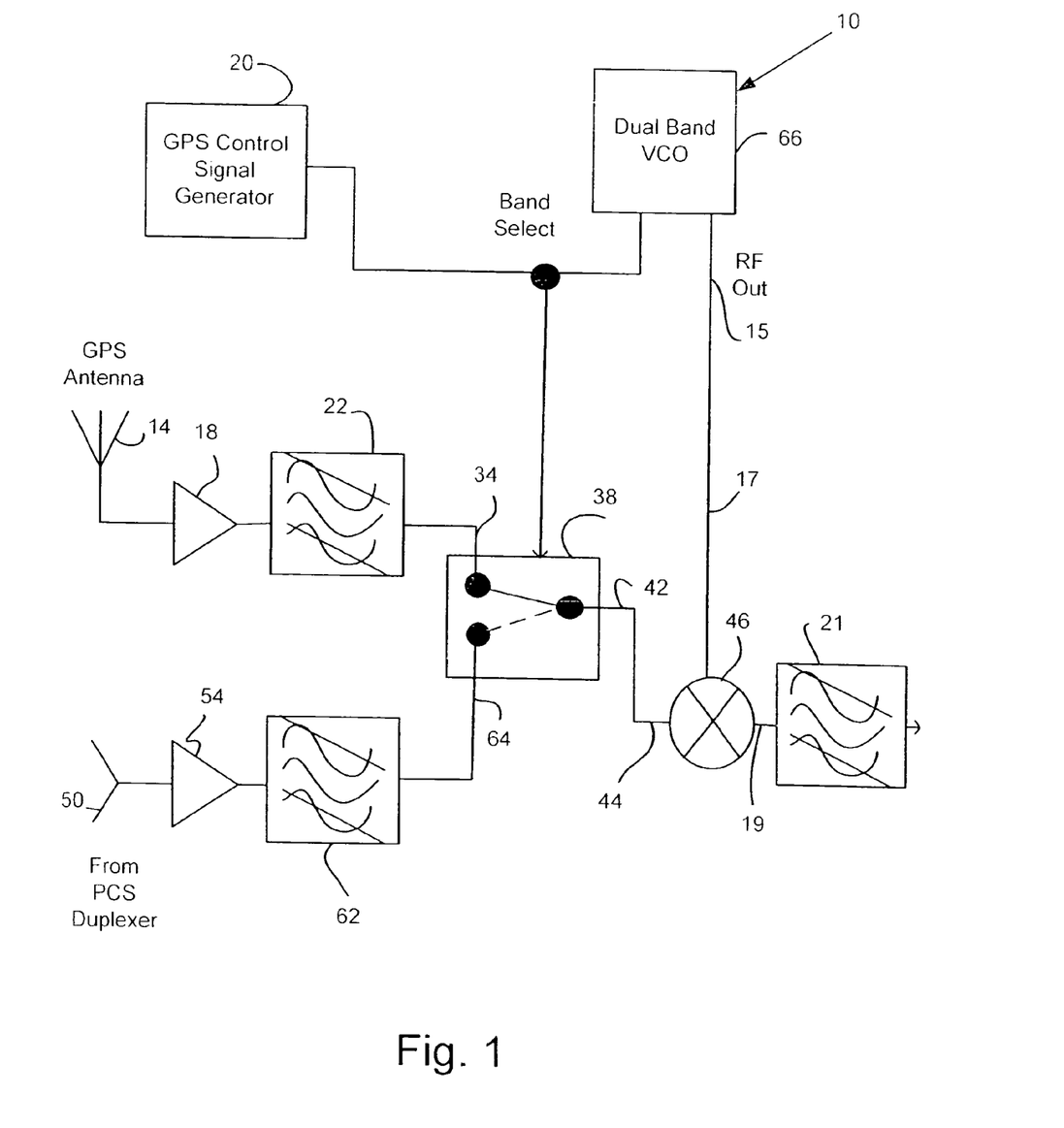
FIG. 1 is a block diagram of a receiver portion in accordance with the present invention.

Referring now to FIG. 1, a receiver portion 10 is shown. Receiver portion 10 may be used, for example, as a receiver portion for a wireless communication device. In a preferred embodiment, the receiver portion 10 is arranged with other known components to constitute a CDMA wireless communication device with integral GPS compatibility. Advantageously, a single mixer 46 is used for both of the PCS and the GPS signals for down conversion to an IF. Using a single mixer to provide GPS and PCS functionality in a wireless communication device enables a lower cost, smaller size and lower power consumption wireless communication device having PCS and GPS functionality.

FIG. 1 is a schematic block diagram of the major assemblies of a multiband receiver portion 10. A GPS antenna 14, for receiving a GPS signal, is coupled to a first low noise amplifier (LNA) 18, for amplifying the GPS signal. The first LNA 18 is coupled to a first band pass filter (BPF) 22 for filtering the GPS signal. The first BPF 22 is coupled to a first input 34 of a band select switch 38. The band select switch 38 selects between the GPS and the PCS bands, responsive to a GPS control signal, generated by a GPS control signal generator 20.

The PCS signal 50 may be received from a PCS duplexer (not shown), which is coupled to a second LNA 54. The second LNA 54 is coupled to a second BPF 62 for filtering the PCS signal. The second BPF 62 is coupled to a second input 64 of the band select switch 38. An output 42 of the band select switch 38 is coupled to a first input 44 of a first mixer 46. This mixer is used for down converting both GPS and PCS signals to an IF signal, providing advantages over the prior art. An RF output 15 (also known as the local oscillator (LO) signal) of a dual band local oscillator 66 is coupled to a second input 17 of the first mixer 46. The first mixer 46 mixes the LO signal with either the PCS signal or the GPS signal to produce the IF, responsive to the GPS control signal generated by the GPS control signal generator 20. The GPS control signal selects which of the local oscillator signals is received by the first mixer 46.

Preferably, a third BPF 21 filters the signal whether it is a GPS signal or a PCS signal. Due to the similar characteristics of CDMA and GPS signals it is possible for an IF signal indicative of a GPS signal and an IF signal indicative of a CDMA signal to pass through the same IF filter 21. Preferably, the IF filter 29 (2 is optimized for CDMA. Thus, an output 19 of the first mixer 46 is coupled to the third BPF 21. This output 19 comprises an IF signal indicative of either the GPS signal or the PCS signal, depending upon which of the GPS signal and the PCS signal is selected by the band select switch 38, which is controlled by the GPS control signal generator 20. Preferably, the same BPF 21 is used, for filtering the IF signal whether the IF signal is indicative of the GPS signal or of the PCS signal, providing advantages over the prior art.

The GPS control signal generator 20 is also preferably coupled to the LO 66. The GPS control signal generator 20 thus selects which LO signal is mixed by the first mixer 46 with either the GPS signal or the PCS signal. If the GPS control signal is on, the LO signal used for down converting the GPS signal to an IF frequency is enabled. If the GPS control signal is not on, the LO signal used for down converting the PCS signal to an IF frequency is enabled. In this way, the same mixer 46 is enabled to be used in conjunction with a first LO signal to down convert a GPS signal to an IF signal and in conjunction with a second LO signal to down convert a PCS signal to an IF signal.

Figure 2:
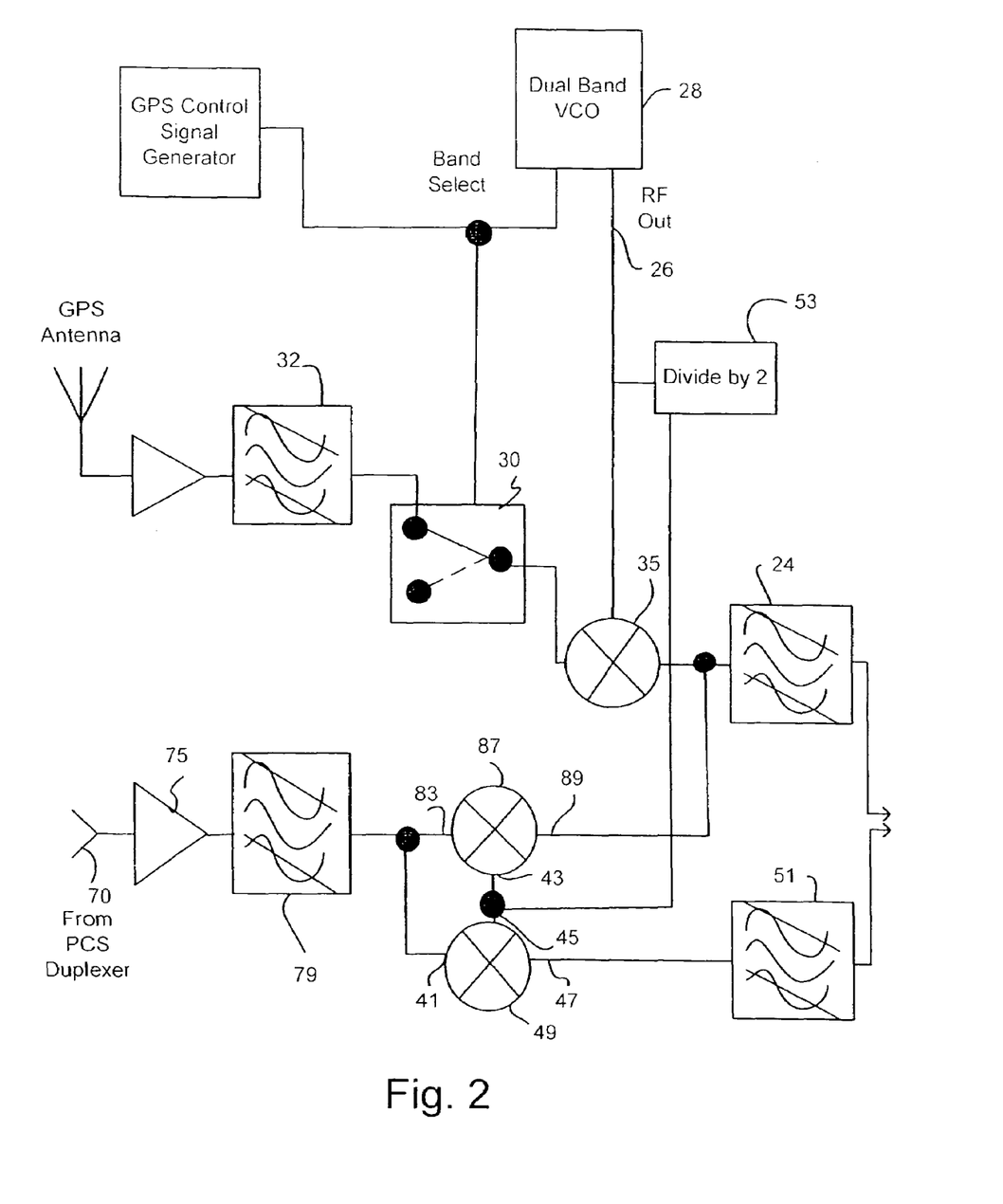
FIG. 2 is a block diagram of a receiver portion showing a common IF filter for filtering a cellular CDMA IF signal and a GPS IF signal in accordance with the present invention.

Referring now to FIG. 2, another embodiment will now be described, in which a single, first BPF 24 is enabled to filter either an IF signal from a GPS signal or an IF signal from a cellular band signal. Thus, an input 70 from a cellular duplexer (not shown) is coupled to a first LNA 75. The first LNA 75 is coupled to a second BPF 79. The second BPF 79 is coupled to a first input 83 of a first mixer 87. A second input 43 of the first mixer 87 is coupled to a divide by two circuit 53. The divide by two circuit 53 is coupled to an RF output 26 of a dual band local oscillator 28. An output 89 of the first mixer 87 is coupled to the first filter 24. In this way, the same filter, the first filter 24, is enabled to be used to filter an IF signal that is indicative of either the GPS signal or the cellular signal.

The cellular signal may, optionally, be an FM signal, rather than a CDMA signal. In this case, the cellular signal will be processed by other baseband processing circuitry (not shown). For signal quality reasons, not fully described here, FM signals are processed also through a separate mixer 49 and IF filter 51 than the CDMA signals. These elements are shown for completeness. Thus, the second BPF 79 is also coupled to a first input 41 of a second mixer 49. The divide by two circuit 53 is coupled to a second input 45 of the second mixer 49. An output 47 of the second mixer 49 is coupled to a third BPF 51. The GPS signal is coupled to the IF filter 24 analogously to how the GPS signal is coupled to the IF filter 21 in FIG. 1. This is not described again here with reference to FIG. 2. Note that a band select switch 30 is optional for the provision of a PCS receive path. A GPS filter 32 may be directly coupled to a mixer 35 for downconversion to an IF. Alternatively for tri-mode phone, the GPS signal may be coupled to the mixer 35 through a diplexer (not shown) or a duplexer (not shown) in lieu of the switch 30.

Figure 3:
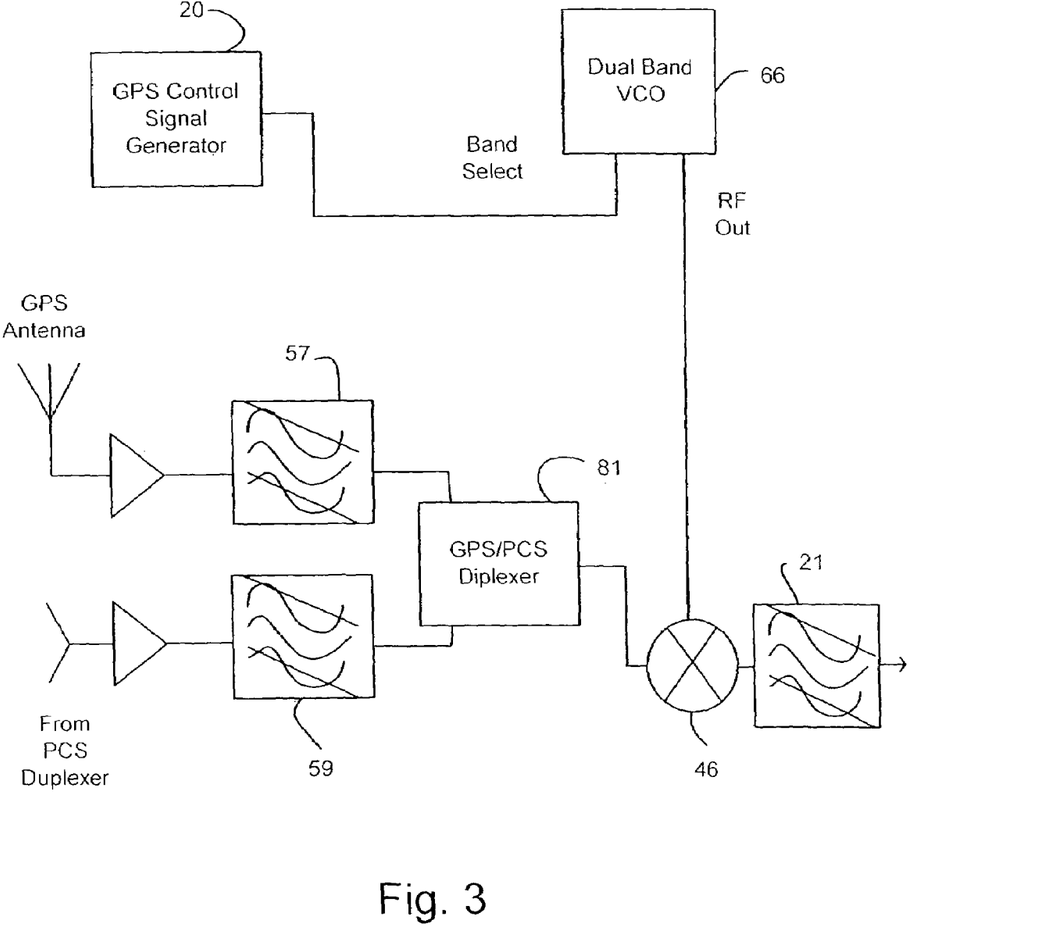
FIG. 3 is a block diagram of a receiver portion showing use of a GPS/PCS diplexer in accordance with the present invention.

Another embodiment is shown in FIG. 3. Components similar to those already described will not be described in detail. A diplexer 81 may be used in place of the band select switch 26, shown in FIG. 1. The diplexer transmits both the PCS signal and the GPS signal to the first mixer 46. In this case, both the PCS signal and the GPS signal are converted to an IF signal by the mixer 46. But only one of the PCS signal and the GPS signal is converted to an IF signal that is in the passband of the third bandpass filter 21. Which of the PCS signal and the GPS signal is converted to an IF signal in the passband of the third bandpass filter 21 depends upon which local oscillator signal is transmitted to the input of the first mixer 46. Which local oscillator signal is transmitted to the first mixer 46 depends upon which local oscillator signal is selected by the GPS control signal generator 20.

Figure 4:
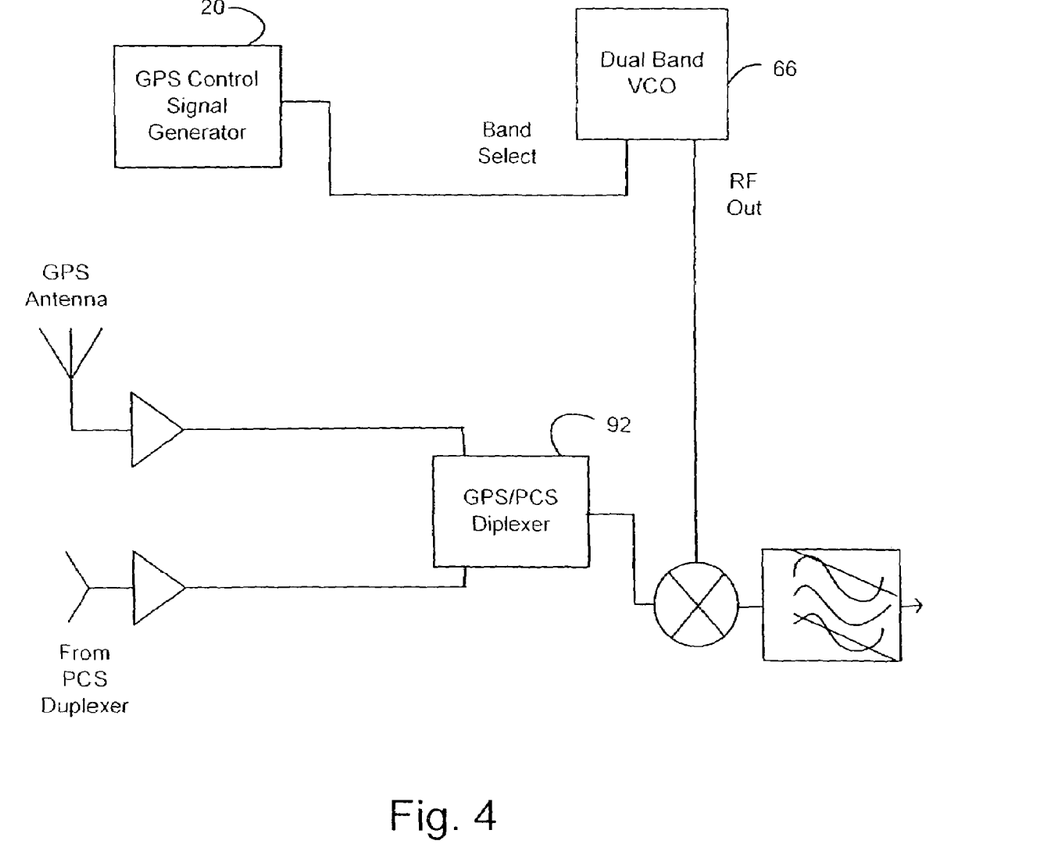
FIG. 4 is a block diagram of a receiver portion showing use of a GPS/PCS duplexer in accordance with the present invention.

Another embodiment is shown in FIG. 4. Again, similar parts to those already described will not be described in detail. A duplexer 92 may replace the first bandpass filter 22, the second bandpass filter 62 and the band select switch 38 shown in FIG. 1 or first and second band pass filters and the diplexer 81 shown in FIG. 3. The duplexer 92 receives both the GPS signal and the PCS signal and filters them, transmitting only the GPS signal and the PCS signal to the first mixer 46. Operation of the mixer 46 and filter 21 are as described previously with reference to FIG. 3.

Figure 5A:
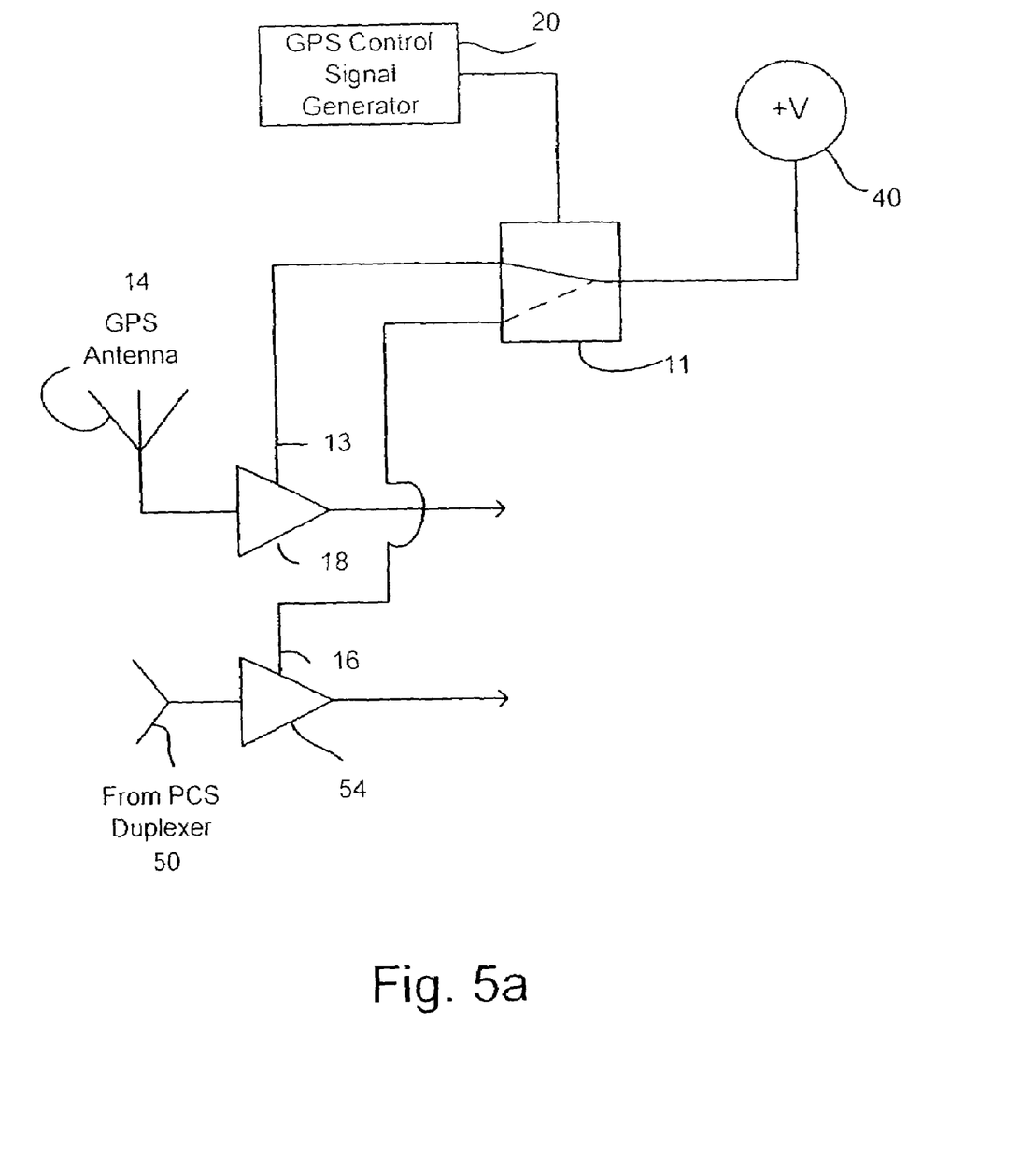
FIG. 5a is a block diagram of a receiver portion showing an example circuit for powering up and down of the GPS and PCS LNA's in accordance with the present invention.
Figure 5B:
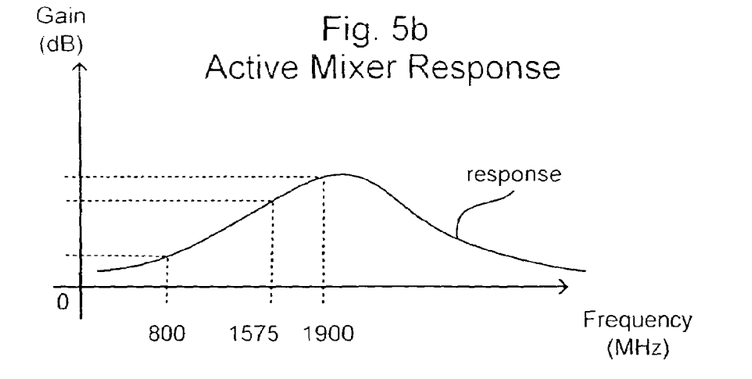
FIG. 5b is a graph showing a frequency response of an active mixer in accordance with the present invention.

Preferably, the GPS control signal generator 37 is used to switch the GPS and PCS LNAs' on and off, as shown in FIG. 5a. When the GPS control signal is on, the GPS LNA 18 is powered on and the PCS LNA 54 is powered off. Conversely, when the GPS control signal is off, the GPS LNA 18 is powered off and the PCS LNA 54 is powered on. Then, regardless of whether a duplexer, a diplexer, or a switch is used for selecting the signals to be coupled to the mixer, only the selected signal reaches the mixer, and consequently, only the selected IF signal reaches the IF filter.

The powering on and off of the GPS LNA and the PCS LNA may be accomplished as shown in FIG. 5a. When the GPS control signal is on, a switch 11 is in a position to transmit current from a power supply 40 to the power line 13 of the GPS LNA 18. In this position of the switch 11, the power supply 40 is not coupled to the power line 16 of the PCS LNA 54. Conversely, when the GPS control signal is off, the switch 11 is in a position to transmit current from the power supply 40 to the power line 16 of the PCS LNA 54 and not to the power line 13 of the GPS LNA 18. It will be appreciated that other components and methods may be used to power on and off the LNA's. Indeed in some designs it may not be necessary to switch power on and off to the LNA's as the LO signal effectively selects which signal is converted to the IF frequency.

It will be appreciated that while the embodiments described with reference to FIGS. 1-5 are separate embodiments, they may be combined in several ways. For example, a single mixer may be used to downconvert PCS and GPS signals to an IF signal, as shown in FIG. 1, while cellular CDMA may be downconverted using a separate mixer as shown in FIG. 2, but may use the same IF filter as used by the PCS and GPS signals. Thus, FIGS. 1 and 2 can be combined to yield a receiver portion wherein a single mixer is used for GPS and PCS signals and a single IF filter is used for GPS, PCS and cellular CDMA signals.

Further its is possible to use a single mixer for all three bands (Cellular, GPS and PCS), providing the mixer is preceded by the requisite LNA and RF filter. Further still, a single mixer may be used for more or different bands, e.g. 3G CDMA at about 2.2 GHz, DCS at about 1.8 GHz or GSM about at 800 MHz.

It may be necessary to use a passive mixer to mix all the bands of interest. Present wireless communication devices use active mixers. As is well known in the art, an active mixer has a relatively narrowband response. Such a response is shown if FIG. 5b. The response may be broad enough to mix both PCS and GPS, but not broad enough to also mix cellular CDMA. An active mixer has a typical gain in the region of interest of between 10 and 12 dB.

Figure 5C:
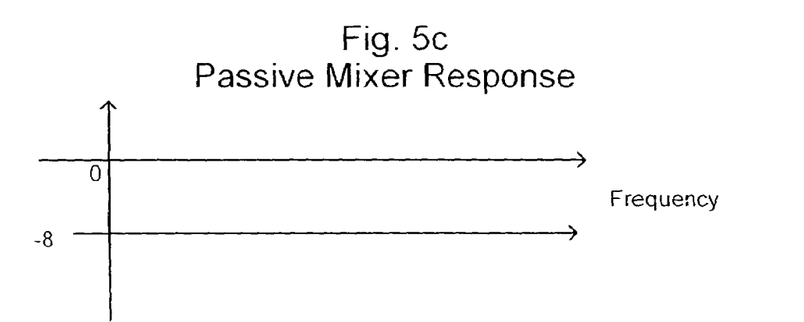
FIG. 5c is a graph showing a frequency response of a passive mixer in accordance with the present invention.

A passive mixer has a more flat response, as shown in FIG. 5c. This allows for mixing of a broader range of frequencies. However, a passive mixer has a conversion loss, as shown in FIG. 5c. The conversion loss of a typical passive mixer is typically 6 to 8 dB, or a gain of −8 dB. Thus, there is a loss of between about 18 and 20 dB incurred by switching from an active to a passive mixer. A counterbalancing gain of about 18 to 20 dB is required to make up for the loss of a passive mixer as compared to an active mixer. An additional amplifiers can be used to provide the gain required.

A receiver portion using a passive mixer to down convert more than two signals to an intermediate frequency signal will now be described with reference to FIG. 5d. Advantageously, this receiver portion re-uses a single mixer for each of several frequencies. Example frequencies include about 2.2 GHz for 3G CDMA, about 1.9 GHz for PCS, about 1.8 GHz for DCS, about 1.575 GHz for GPS, about 900 MHz for cellular CDMA and about 800 MHz for GSM. All of these frequencies can be down converted to a lower frequency signal by one mixer. It will be understood by those skilled in the art that this list is not exhaustive, but is intended by way of example only. Other frequencies could also be down converted to a lower frequency signal by the same mixer.

Figure 5D:
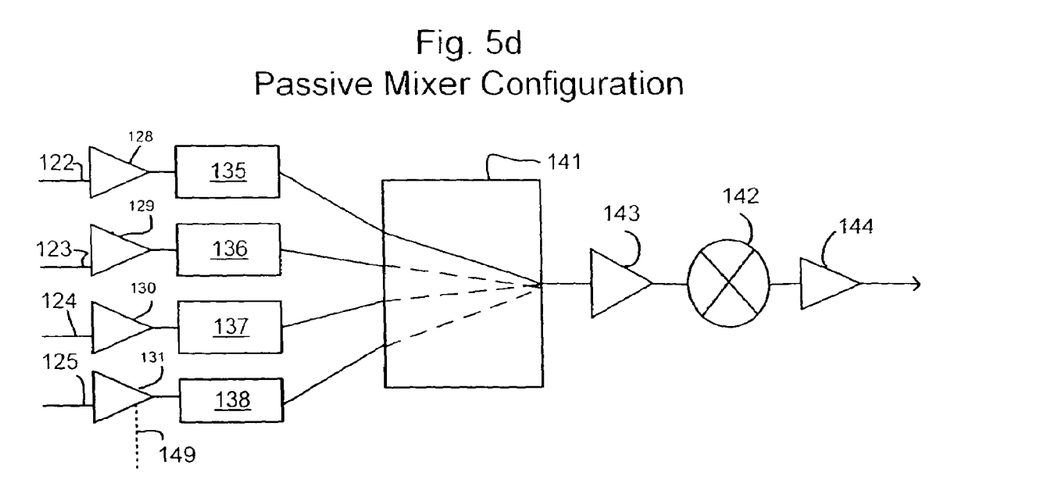
FIG. 5d is a block diagram showing reuse of a passive mixer in accordance with the present invention.

Referring now to FIG. 5d, four input lines 122, 123, 124 and 125 are shown coupled to four LNA's 128, 129, 130 and 131. Any of the signals of interest, such as, for example, 3G CDMA, PCS, GPS may be coupled individually to these input lines. The LNA's 128, 129, 130 and 131 are coupled to four BPF's 135, 136, 137 and 138. Optionally, there may also be more input lines, LNA's and BPF's (not shown) for accommodating more than four signals. The BPF's 135, 136, 137 and 138 are coupled to a switch 141. The switch is used to select between the input lines 122, 123, 124 and 125. The output to the switch is coupled to a mixer 142. Optionally, an LNA 143 is coupled between the switch 141 and the mixer 142. In another option, an LNA 144 is coupled between the mixer 142 and an IF signal line 147. In yet another option, both LNA 143 and LNA 144 are coupled on either side of mixer 142. Either or both of LNA's 143 and 144 make up for the increased loss of the passive mixer 142 as compared to an active mixer. In this way, a single mixer 142 can be advantageously used to mix many bands down to an IF. The bands are not constrained to be near each other in frequency.

It will be appreciated by one skilled in the art that the increased loss of the passive mixer 142 as compared to an active mixer could be made up for in other ways. The LNA's 143 and 144 are shown by way of example only. It will also be understood by one skilled in the art that more than four signals may be downconverted to an IF in this way. More input lines, more LNA's and more BPF's (not shown) would be coupled to the switch 141. The additional input lines, LNA's and BPF's are indicated by the dashed line 149.

Figure 6:
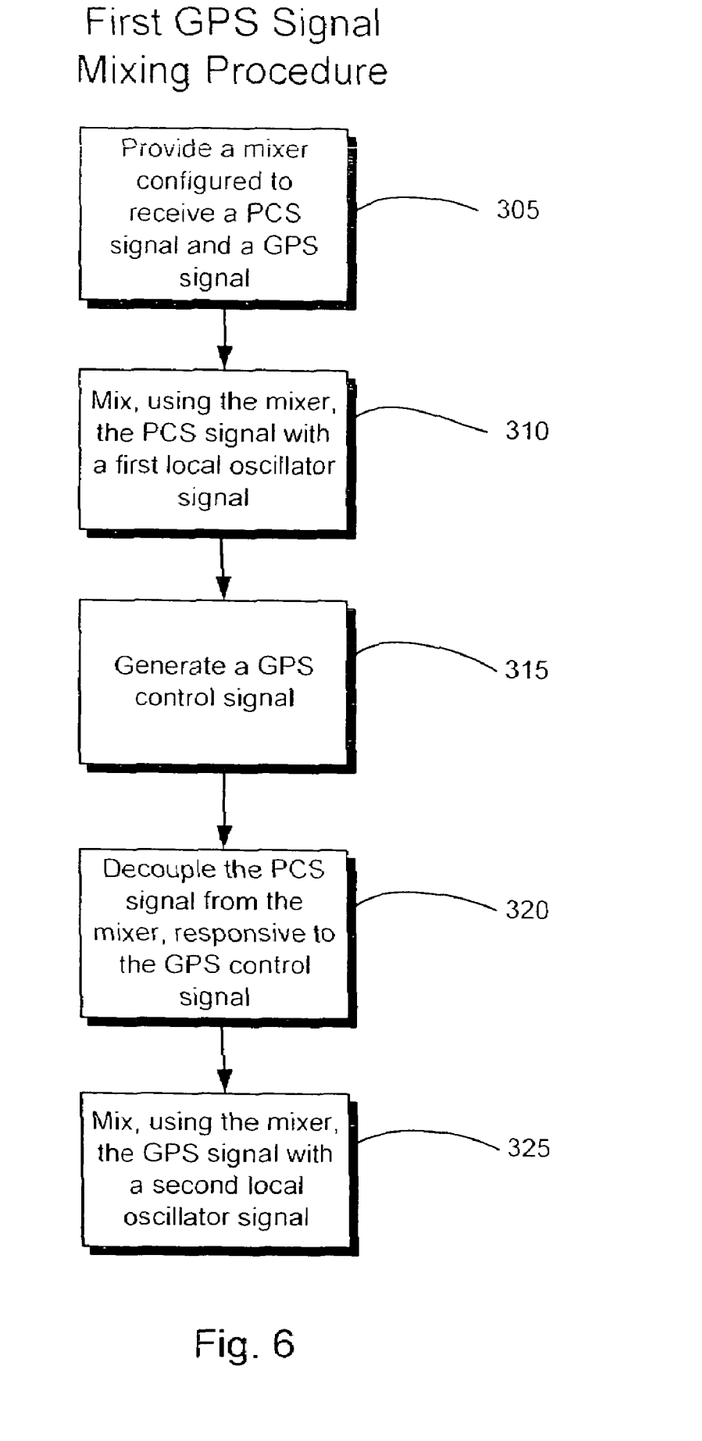
FIG. 6 is a flow chart showing a method for mixing a GPS signal and a PCS signal in accordance with the present invention.

A method of converting a GPS signal to an intermediate frequency signal is shown in FIG. 6. First, in step 305, a mixer is provided and configured to receive a PCS signal and a GPS signal. This mixer, for example, could be a mixer 46 such as shown in FIG. 1. It could, for example, be configured as shown in any of FIGS. 1-4, or in any other way that is well known in the art for providing two different signals to a mixer.

Second, in step 310, the PCS signal is mixed, using the mixer, with a first local oscillator signal. The first local oscillator signal may come from a dual band local oscillator 66 as shown in FIG. 1. Alternatively, the first local oscillator signal may be coupled to the mixer in any configuration well known in the art.

Third, in step 315, a GPS control signal, also known as a GPS control signal, is generated. This GPS control signal may be a result of a manual switch manipulated by a wireless communication device user or by any software or hardware method that is known in the art of electronic communication. The GPS control signal indicates whether the communication device is to be used at the moment in GPS mode or PCS mode.

Fourth, in step 320, the PCS signal is decoupled from the mixer, responsive to the GPS control signal. A band select switch may be used to decouple the PCS signal from the mixer, such as is shown in FIG. 1. Alternatively, any known method of decoupling RF signals from mixers may be used.

Fifth, in step 325, the mixer is used to mix the GPS signal with a second local oscillator signal, producing an intermediate frequency signal.

Figure 7:
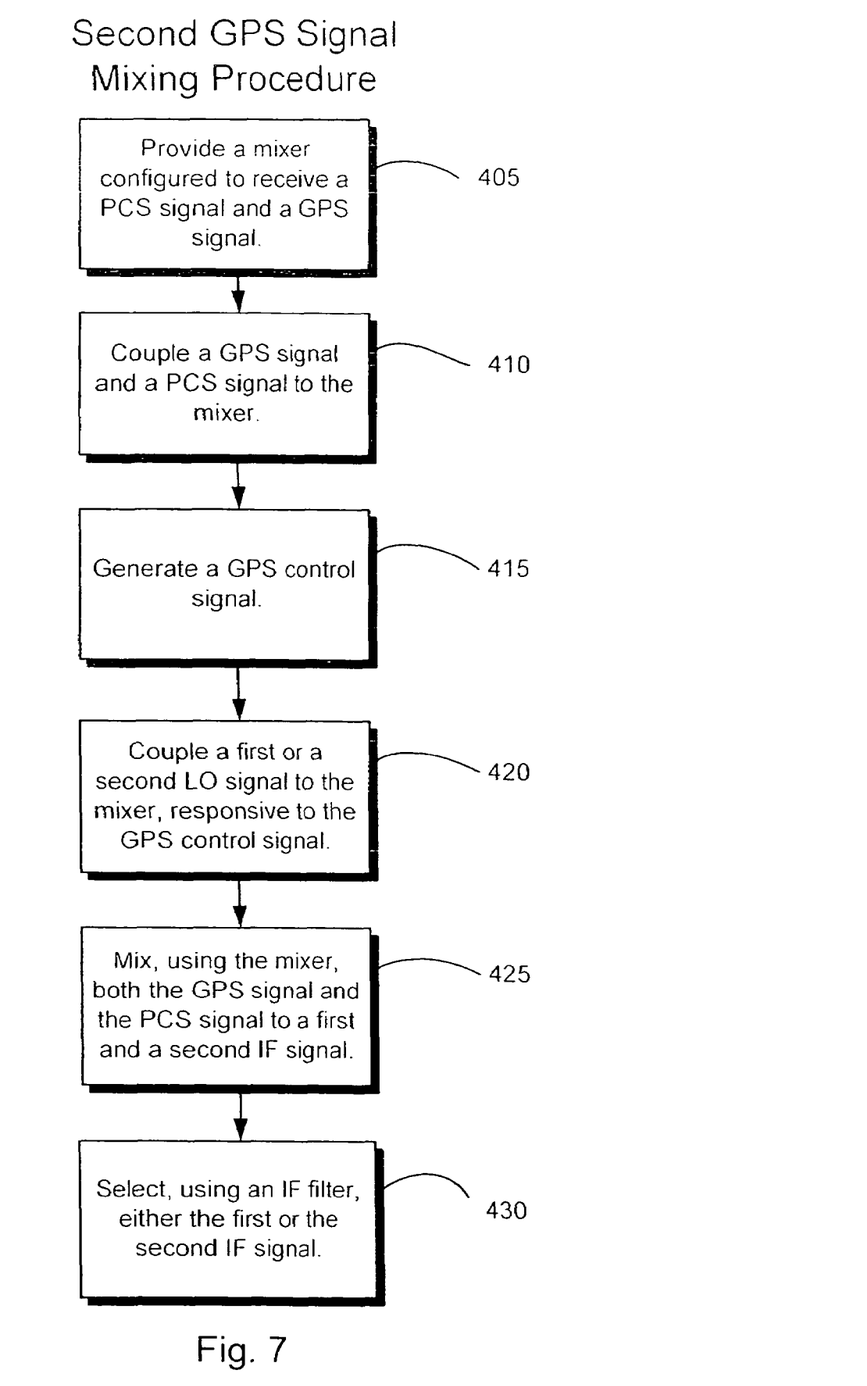
FIG. 7 is a flow chart showing an alternative method for mixing a GPS signal and a PCS signal in accordance with the present invention.

A method of converting a GPS signal to one IF signal and a PCS to another IF signal using the same mixer is shown in FIG. 7. An IF filter is used to select which IF signal to use for further processing. First, in step 405, a mixer is provided and configured to receive a PCS signal and GPS signal. This mixer, for example, could be a mixer 46 such as shown in FIG. 3. It could, for example, be configured as shown in either of FIGS. 3-4, or in any other way that is well known in the art for providing two different signals to a mixer.

Second, in step 410, a GPS signal and a PCS signal are coupled to the mixer. Third, in step 415, a GPS control signal, also known as a GPS control signal, is generated. This GPS control signal may be a result of a manual switch manipulated by a wireless communication device user or by any software or hardware method that is known in the art of electronic communication. The GPS control signal indicates whether the communication device is to be used at the moment in GPS mode or PCS mode.

Fourth, in step 420, either a first or a second local oscillator (LO) signal is coupled to the mixer, responsive to the GPS control signal. The first and second local oscillator signals may come from a dual band local oscillator 66 as shown in FIG. 1. Alternatively, the first local oscillator signal may be coupled to the mixer in any configuration well known in the art.

Fifth, in step 425, the GPS signal and the PCS signal are mixed with the first or second local oscillator signal by the mixer, depending on which local oscillator signal is coupled to the mixer. Regardless of which local oscillator signal is coupled to the mixer, it will be mixed with both the GPS and the PCS signals.

Sixth, in step 430, either the first or the second IF signal is selected by the IF filter for further processing. In this way, one IF filter is enabled to be used for both GPS and PCS IF signal filtering.

To make one filter usable for both GPS and PCS IF filtering, the local oscillator frequencies should be carefully chosen. A common IF is 183.6 MHz. To obtain this IF, a local oscillator frequency in the region of 2143.6 MHz is commonly used in conjunction with the PCS signal. This is injected on the high side of the PCS Rx signal, commonly in the region of 1960 MHz, giving an IF of 183.6 MHz. Thus, a local oscillator signal at 2143.6 MHz can be referred to as a PCS local oscillator signal.

To obtain an IF signal from a GPS signal, commonly at 1575.42 MHz, a low side injection of a local oscillator can be used, with a frequency of 1391.82 MHz. Thus, a local oscillator signal at 1391.82 MHz can be referred to as a GPS local oscillator signal. This way, whether the 1391.82 MHz local oscillator or the 2143.6 MHz local oscillator is coupled to the mixer, only one signal in the passband of the IF filter, at 183.6 MHz, will pass through the IF filter. It will be understood that alternative frequencies and injection schemes can be implemented and are within the scope of this invention. It is preferred that the GPS signal does not create harmonic or other undesired signals in the rage of the IF filter when mixed with the PCS local oscillator signal. It is also preferred that the PCS signal does not create harmonic or other undesired signals in the range of the IF filter when mixed with the GPS local oscillator signal.

It will be understood that the foregoing embodiments are intended by way of example only. It is to be understood that there are many ways of implementing the invention. The invention is only intended to be limited by the claims that follow.

The invention claimed is:

1. A receiver portion for selectively converting a GPS signal and a second RF signal to an intermediate frequency (IF) signal in a wireless handset, comprising:
    a GPS antenna configured to receive the GPS signal;
    a second RF signal antenna configured to receive the second RF signal;
    a control signal generator configured to generate a control signal;
    a band select switch connected to the control signal generator, to the GPS antenna, and to the second RF antenna, the band select switch configured to select one of the GPS signal and the second RF signal responsive to the control signal to determine a selected signal;
    a local oscillator (LO) connected to the control signal generator, the LO configured to generate an LO signal having a LO oscillating frequency responsive to the control signal, the LO oscillating frequency lower than a GPS frequency of the GPS signal when a frequency of the second RF signal is higher than the GPS frequency, the LO oscillating frequency higher than the GPS frequency when the frequency of the second RF signal is lower than the GPS frequency; and
    a mixer connected to the band select switch and to the local oscillator, the mixer configured to mix the selected signal and the LO signal to generate the IF signal.

2. The receiver portion of claim 1 where the second RF signal is higher than the GPS signal and the LO signal comprises two signals, one higher than the RF signal that in combination with the RF signal comprises IF, and one lower than the GPS signal that in combination with the GPS signal comprises IF.

3. The receiver portion of claim 2 where the LO signal comprises a signal substantially in the range of 1391-1392 MHz.

4. The receiver portion of claim 2 where the second RF signal is a PCS signal.

5. The receiver portion of claim 4 where the PCS signal is a CDMA signal.

6. The receiver portion of claim 4 where the LO output comprises a signal substantially in the range of 2143-2144 MHz.

7. The receiver portion of claim 1 where the IF frequency is substantially in the range of 183-184 MHz.

8. The receiver portion of claim 1 where the second RF signal is lower than the GPS signal and the LO signal comprises two signals, one lower than the RF signal that in combination with the RF signal comprises IF, and one higher than the GPS signal that in combination with the RF signal comprises IF.

9. A receiver portion for selectively converting a GPS signal and a second RF signal to an intermediate frequency (IF) signal in a wireless handset, comprising:
   a GPS antenna assembly configured to receive the GPS signal;
   a second RF signal antenna assembly configured to receive the second RF signal;
   a control signal generator configured to generate a control signal;
   a diplexer configured to receive input from the GPS antenna and the second RF antenna;
   a local oscillator (LO) configured for at least one pair of signals from a first pair (1P) of signals or a second pair (2P) of signals, where the 1P signals are operable when the second RF signal is a higher frequency than the GPS signal, and the 2P signals operable when the second RF signal is a lower frequency than the GPS signal, and where the 1P signals further comprise an RF-associated (1P-RF) signal that is of higher frequency than the second RF signal and a GPS-associated (1P-GPS) signal that is lower than the frequency of the GPS signal, and the 2P signals further comprise an RF-associated (2P-RF) signal that is of lower frequency than the second RF signal and a GPS-associated (2P-GPS) signal that is of higher frequency than the GPS signal, the LO responsive to the control signal to send an RF-associated signal or a GPS-associated signal;
   a mixer configured to receive signals from the LO and the diplexer; and
   an IF filter configured to receive input from the mixer and transmit IF signals.

10. The receiver portion of claim 9 where the second RF frequency is higher than the GPS frequency, and the LO output is one of the 1P signals in accordance with the control signal.

11. The receiver portion of claim 10 where said 1P-GPS signal is substantially in the range of 1391-1392 MHz.

12. The receiver portion of claim 10 where the second RF signal is a PCS signal.

13. The receiver portion of claim 12 where the PCS signal further comprises CDMA signals.

14. The receiver portion of claim 12 where the 1P-RF signal is substantially in the range of 2143-2144 MHz.

15. The receiver portion of claim 9 where the IF frequency is substantially in the range of 183-184 MHz.

16. The receiver portion of claim 9 where the second RF frequency is lower than the GPS frequency, and the LO output is one of the 2P signals in accordance with the GPS control signal.

17. A method of using a mixer and a filter for processing both a GPS signal and a second RF signal, the mixer configured to receive the GPS signal and the second RF signal comprising:
   coupling the GPS signal and the second RF signal to the mixer;
   generating a control signal;
   configuring a local oscillator (LO) for one of a first pair (1P) of signals and a second pair (2P) of signals, where the 1P signals are configured for use when the second RF signal is a higher frequency than the GPS signal, and the 2P signals are configured for use when the second RF signal is a lower frequency than the GPS signal, and where the 1P signals further comprise an RF-associated signal of higher frequency than the second RF signal such that IF frequencies result when combined, and a GPS-associated signal lower than the frequency of the GPS signal such that IF frequencies result when combined, and the 2P signals further comprise an RF-associated signal of lower frequency than the second RF signal such that IF frequencies result when combined, and a GPS-associated signal that is of higher frequency than the GPS signal such that IF frequencies result when combined, the LO configuration having a selected pair, where the LO is responsive to the control signal to send the RF-associated signal or the GPS-associated signal from the selected pair;
   sending from the LO either the GPS-associated signal or the RF-associated signal from the selected pair;
   receiving, at the mixer, the signal sent by the LO;
   mixing both the GPS signal and the second RF signal with the signal sent by the LO; and
   selecting by use of an IF filter the first or the second mixed signal.

18. The method of claim 17 wherein the second RF signal comprises a PCS signal and the selected pair is 1P.

19. The method of claim 18 wherein the PCS signal comprises a CDMA signal.

20. The method of claim 17 where the second RF signal is lower than the GPS signal, and the selected pair is 2P.

* * * * *